US010486059B1

(12) United States Patent
Golden et al.

(10) Patent No.: US 10,486,059 B1
(45) Date of Patent: *Nov. 26, 2019

(54) PLACEMENT OF VIRTUAL ELEMENTS IN A VIRTUAL WORLD ASSOCIATED WITH A LOCATION-BASED PARALLEL REALITY GAME

(71) Applicant: Niantic, Inc., San Francisco, CA (US)

(72) Inventors: Keith P. Golden, San Francisco, CA (US); Mark A. Aubin, Sunnyvale, CA (US); John V. Hanke, Piedmont, CA (US); Phillip Craig Keslin, San Jose, CA (US); James Dinkelacker, Lahaina, HI (US); Charles Spirakis, Los Altos, CA (US); Alexander Vladimirov, San Francisco, CA (US)

(73) Assignee: Niantic, Inc., San Francisco, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/728,462

(22) Filed: Oct. 9, 2017

Related U.S. Application Data

(63) Continuation of application No. 13/955,089, filed on Jul. 31, 2013, now Pat. No. 9,782,668.

(60) Provisional application No. 61/677,529, filed on Jul. 31, 2012.

(51) Int. Cl.
*A63F 13/00* (2014.01)
*A63F 13/216* (2014.01)

(52) U.S. Cl.
CPC ............ *A63F 13/00* (2013.01); *A63F 13/216* (2014.09)

(58) Field of Classification Search
CPC .......... A63F 13/30; A63F 13/55; A63F 13/60; A63F 13/31; A63F 13/332; A63F 13/216; A63F 2300/406; A63F 2300/216
See application file for complete search history.

(56) References Cited

U.S. PATENT DOCUMENTS

| | | | |
|---|---|---|---|
| 9,782,668 B1 * | 10/2017 | Golden | A63F 13/00 |
| 2004/0176082 A1 * | 9/2004 | Cliff | A63F 13/12 455/414.4 |
| 2009/0017913 A1 * | 1/2009 | Bell | H04W 4/02 463/40 |
| 2010/0050237 A1 * | 2/2010 | Bokor | G06F 16/9537 726/4 |
| 2012/0244945 A1 * | 9/2012 | Kolo | A63F 13/61 463/42 |

(Continued)

*Primary Examiner* — Jay Trent Liddle
*Assistant Examiner* — Alex F. R. P. Rada, II
(74) *Attorney, Agent, or Firm* — Fenwick & West LLP

(57) ABSTRACT

Computer-implemented methods and systems for locating virtual elements that can be used or collected by players of a parallel reality game having a virtual world that parallels at least a portion of the real world are provided. In particular, the location of virtual elements in the virtual world is determined based on data associated with one or more real world conditions. Virtual elements can be located in the virtual world at locations corresponding to locations in the real world that encourage safe and effective game play. Locating virtual elements in the virtual world based on data associated with real world conditions improves the link between the parallel virtual world and the real world, enhancing the illusion that the virtual world is another dimension of the real world that the player can interact with through the parallel reality game.

20 Claims, 6 Drawing Sheets

(56) References Cited

U.S. PATENT DOCUMENTS

| | | | | |
|---|---|---|---|---|
| 2013/0005466 A1* | 1/2013 | Mahajan | ............... | A63F 13/216 |
| | | | | 463/36 |
| 2013/0227017 A1* | 8/2013 | Gahlings | ................. | H04L 51/04 |
| | | | | 709/204 |

* cited by examiner

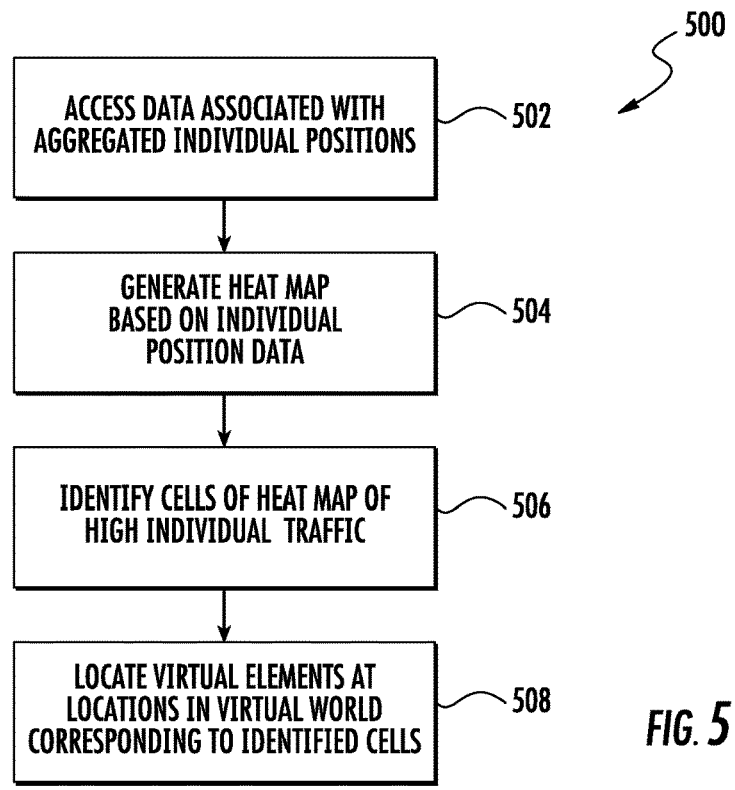
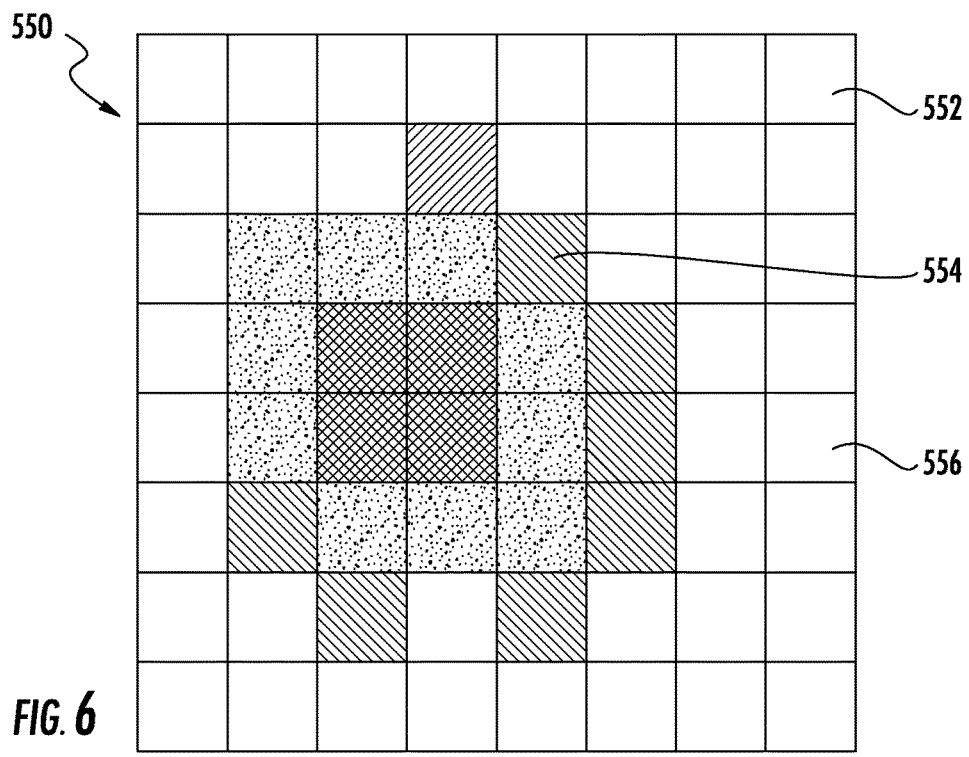

US 10,486,059 B1

PLACEMENT OF VIRTUAL ELEMENTS IN A VIRTUAL WORLD ASSOCIATED WITH A LOCATION-BASED PARALLEL REALITY GAME

PRIORITY CLAIM

The present application claims the benefit of priority of U.S. Provisional Patent Application Ser. No. 61/677,529, titled Placement of Virtual Elements in a Virtual World Associated with a Location-Based Parallel Reality Game, filed Jul. 31, 2012, which is incorporated herein by reference.

FIELD

The present disclosure relates generally to location-based gaming, and more particularly, to a system and method for locating virtual elements in a virtual world associated with a location-based parallel reality game.

BACKGROUND

Computer-based and/or electronic gaming systems are known that provide a shared virtual environment for many players to interact in a virtual world. With increased availability and connectivity to the Internet, many players from all over the world can interact in the virtual environment and perform various game objectives. Such gaming systems typically do not have a virtual world geography that parallels the real world. Location-based games use the real world as their geography. Some location-based games add virtual locations on a map that parallels the real world geography. Such games, however, are typically focused on real world objectives. These games typically do not include a virtual world that parallels the real world and that acts as a virtual game environment in which many players can interact and perform various game objectives in the parallel virtual world by navigating and performing actions in the real world.

A parallel reality game providing a shared virtual world that parallels at least a portion of the real world allows players to interact in the virtual world by navigating the real world. A parallel reality game can have many positive benefits, such as encouraging physical activity and getting players to interact more in towns and communities. However, if the virtual world does not effectively mirror the real world, controlling the parallel reality game by navigating the real world can feel contrived, discouraging game play.

Lack of agreement between the real world and the virtual world can also make a parallel reality game dangerous, encouraging players to navigate to areas in the real world that are not safe, such as into heavy traffic or other hazardous areas while playing the game. The game may also encourage players to interact in their community in non-constructive or illegal ways, such as entering private property to access corresponding locations in the virtual world that have desirable virtual elements. Finally, it may be more trouble than fun to play the parallel reality game if virtual elements are located at corresponding hard to reach locations in the real world that are far out of the player's way.

SUMMARY

Aspects and advantages of embodiments of the invention will be set forth in part in the following description, or may be obvious from the description, or may be learned through practice of the embodiments.

One exemplary aspect of the present disclosure is directed to a computer-implemented method of locating virtual elements in a parallel reality game. The method includes hosting, at a computing device, the parallel reality game. The parallel reality game has a virtual world having a geography that parallels at least a portion of the geography of the real world such that a player can navigate the virtual world by moving to different geographic locations in the real world. The method further includes accessing a data source storing data associated with one or more real world conditions and determining a location for a virtual element in the virtual world based at least in part on the data associated with one or more real world conditions. The method further includes modifying game data associated with the parallel reality game to locate a virtual element at the location in the virtual world determined based at least in part on the data associated with the one or more real world conditions.

Another exemplary aspect of the present disclosure is directed to a computer-implemented method. The method includes receiving, at a computing device, game data associated with a parallel reality game. The parallel reality game has a virtual world having a geography that parallels at least a portion of the geography of the real world such that a player can navigate the virtual world by moving to different geographic locations in the real world. The game data specifies the location of a virtual element in the virtual world associated with the parallel reality game. The game data is determined based at least in part on data associated with one or more real world conditions. The method further includes presenting on a user interface of a display device a representation of the virtual world. The representation of the virtual world includes the virtual element located at the location determined based on the data associated with the one or more real world conditions.

Other exemplary implementations of the present disclosure are directed to systems, apparatus, non-transitory computer-readable media, devices, and user interfaces for locating virtual elements in a virtual world associated with a parallel reality game.

These and other features, aspects and advantages of various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 5 depicts a flow diagram of an exemplary method for determining the location of a virtual element based on data associated with real world conditions according to an exemplary embodiment of the present disclosure; and FIG. 6 depicts a visual representations of exemplary cell based heat map generated according to an exemplary embodiment of the present disclosure;

DETAILED DESCRIPTION

Figure 1:
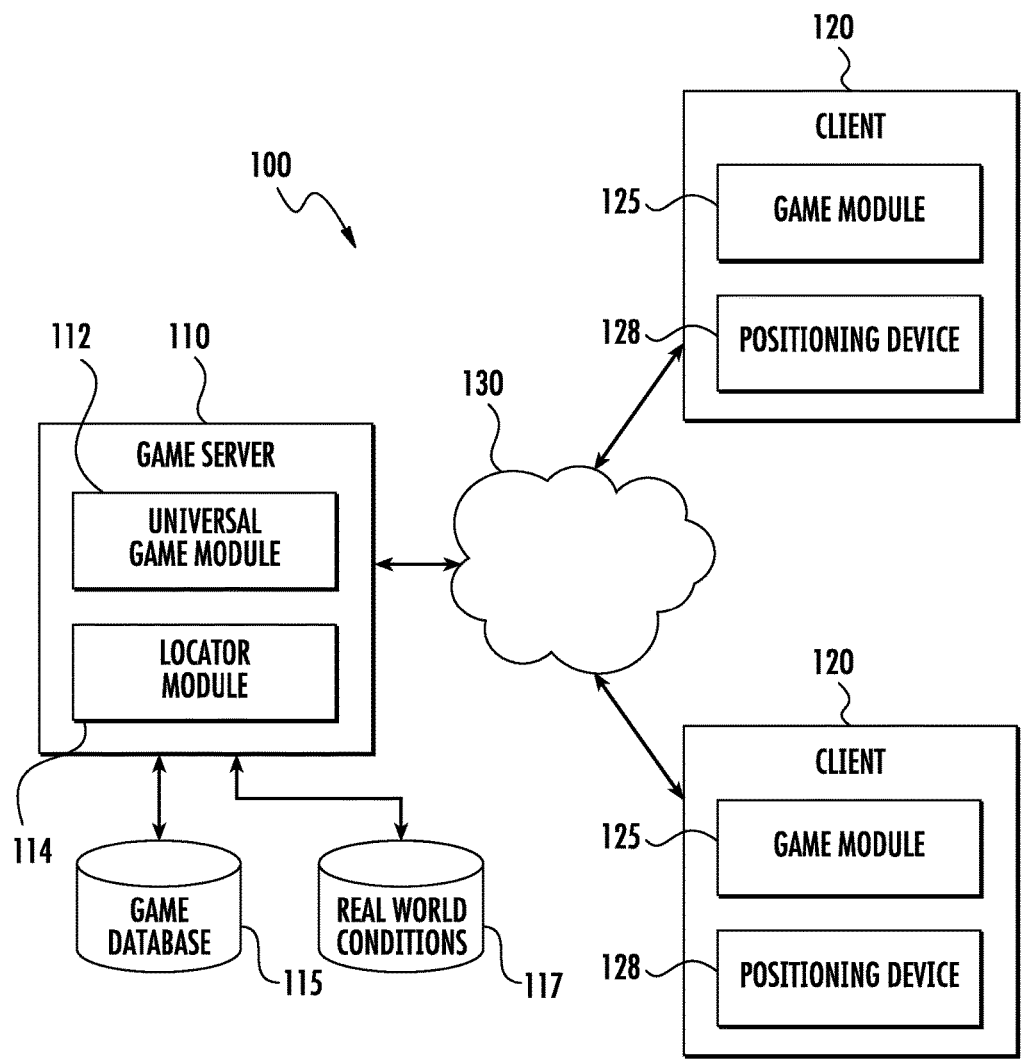
FIG. 1 depicts an exemplary computer-based system for implementing a location-based game according to an exemplary embodiment of the present disclosure.

Reference now will be made in detail to embodiments of the invention, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the invention. For instance, features illustrated or described as part of one embodiment can be used with another embodiment to yield a still further embodiment. Thus, it is intended that aspects of the present disclosure cover such modifications and variations.

Overview

Generally, the present disclosure is directed to locating virtual elements, such as virtual objects, virtual items, virtual energy, and other virtual elements, in a virtual world that parallels at least a portion of the real world. In particular, the location of virtual elements in the virtual world is determined based on data associated with one or more real world conditions. In this way, virtual elements can be located in the virtual world at locations corresponding to locations in the real world that encourage safe and effective game play. Moreover, locating virtual elements in the virtual world based on data associated with real world conditions improves the link between the parallel virtual world and the real world, further enhancing the illusion that the virtual world is another dimension of the real world that the player can perceive and interact with through the parallel reality game.

A game server can host a location-based parallel reality game having a player gaming area that includes a virtual environment with a geography that parallels at least a portion of the real world geography. Players can navigate a virtual space in the virtual world by navigating a corresponding geographic space in the real world. In particular, players can navigate a range of coordinates defining a virtual space in the virtual world by navigating a range of geographic coordinates in the real world.

In one aspect, the positions of players can be monitored or tracked using, for instance, a positioning system (e.g. a GPS system) associated with a player's mobile computing device (e.g. cell phone, smartphone, gaming device, or other device). As players move about in the real world, player position information can be provided to the game server hosting the parallel reality game over a network. The game server can update player positions in the parallel virtual world to correspond with the player positions in the real world.

The parallel reality game can include one or more virtual elements that players can interact with during the course of the parallel reality game. To interact with a virtual element, a player may have to travel to the corresponding location of the virtual element in the real world and perform any necessary interactions in the parallel reality game. According to aspects of the present disclosure, virtual elements are located in the virtual world based on data associated with real world conditions. The data associated with real world conditions can be analyzed to determine locations that are suitable and/or are not suitable for placement of virtual items in the virtual worlds. For instance, virtual elements can be located at positions that are readily accessible in the real world and that do not require players to travel to locations in the real world that are potentially unsafe or difficult to access in order to play the parallel reality game.

According to a particular aspect of the present disclosure, a game server can access data associated with one or more real world conditions, analyze the data, and adjust game data associated with the parallel reality game to locate virtual elements at locations determined to be suitable for placement of virtual elements based on the data associated with the one or more real world conditions. Exemplary data associated with real world conditions can include the aggregate locations of individuals and/or players in the real world; local data providing locations of cultural value, historic value, or commercial value; road map data providing the locations of roads, highways, and/or waterways; current and past locations of individual players of the game; hazard data; weather data; event calendar data; and other suitable data.

Tying the location of virtual elements to real world conditions permits the directing of players of the parallel reality game to places that are fun, safe, and appropriate to walk around in the real world and ensures that players find virtual elements to interact with in locations the players are likely to frequent. In this manner, the subject matter of present disclosure can have a technical effect of providing for an improved computer-based implementation of a parallel reality game that provides for the location of virtual elements in a virtual world that parallels the real world in a manner that encourages game play in a safe and effective manner and that improves the link between the real world and the parallel virtual world.

In one embodiment, a game server associated with a parallel reality game can access data associated with the aggregate locations of individuals in the real world. The data associated with the aggregate locations of individuals in the real world can be obtained or derived from any suitable source. The data associated with the aggregate locations of individuals in the real world can include the aggregate locations of mobile device users in the real world. In particular, users of mobile devices, such as smart phones, can optionally provide position information, in terms of geographic location in the real world, in order to enhance certain location-based features or other functionality. This data can be used to determine the placement of virtual elements in the parallel virtual world. It should be understood that location information associated with a mobile device user is accessed or utilized only if permission is granted by the user after the user has been notified that location information is to be accessed and how the location information is to be utilized. In addition, any location information associated with users will be stored and maintained in a manner to protect anonymity and privacy.

Data associated with the aggregate locations of individuals in the real world can also include data associated with the aggregate locations of players of the parallel reality game. In particular, the game server can receive position information from each of the plurality of players during play of the parallel reality game such that the game server can update the position of the player in the parallel virtual world associated with the parallel reality game. Alternatively or in addition, data associated with the aggregate locations of individuals in the real world can include population maps/data or other suitable data source. Population maps can be used to determine data associated with the aggregate locations of individuals in the real world that is not skewed towards smartphone users.

The game server can analyze the data associated with the aggregate locations of individuals in the real world and determine where to locate virtual elements in the virtual world based on the data. For instance, the game server can arrange for the location of virtual elements in the virtual world in high traffic areas based on the data associated with aggregate locations of the individuals in the real world. Placement of virtual objects in a virtual world at locations corresponding to high traffic areas can give players something to do in locations the players are more likely to visit and that are more likely to be safe and public.

In a particular implementation, the data associated with the aggregate locations of individuals in the real world can include a population heat map that represents the relative number of individuals at specific geographic locations in the real world. The heat map can include a plurality of cells with each cell being associated with a specific geographic location in the virtual world and corresponding location in the real world. The heat map can include different values for each cell depending on the number of individuals located in the cell. The game server can analyze the heat map and assign virtual elements to locations corresponding to cells with relatively high values. In this way, the game server can locate virtual elements in the virtual world at locations having a greater number of individuals in the real world.

The game server can locate virtual objects in the parallel virtual world based on other data associated with real world conditions. For instance, the game server can locate virtual objects based on local data providing locations of cultural, recreational, or commercial value, rod map data providing the locations of roads and highways, waterways, private property, and other unsafe locations, hazard data, weather data, event calendar data, and other suitable data. As an example, the game server can locate virtual elements at locations in the virtual world based on data associated with real world conditions corresponding to locations of public, educational, commercial, or recreational value, such as locations of public artwork, tourist attractions, scenic vistas, libraries, or hiking trails.

Other exemplary applications of data associated with real world conditions can include: (1) avoiding placement of virtual objects in the virtual world at locations corresponding to areas proximate or close to highways or waterways in the real world; (2) avoiding placement of virtual objects in the virtual world at locations corresponding to private property in the real world (as determined, for instance, from map data or from areas with low player density determined from, for instance, a heat map); (3) avoiding placement of virtual elements in locations corresponding to hazardous areas in the virtual world; (4) avoiding placement of virtual elements in locations corresponding to low pedestrian traffic at night; (5) placement of virtual elements in locations corresponding to sheltered locations in the real world during bad weather; (6) placement of virtual elements in locations corresponding to outdoor locations in the real world during good weather; (7) placement of virtual elements in locations corresponding to locations of sporting events, conferences, or other events (as determined, for instance, from event calendar data) that draw large crowds.

According to a particular aspect of the present disclosure, a game server can be configured to place virtual elements along a predicted path of a player determined, for instance, based on real world data associated with current player location and direction, past location history of the player, aggregate movement of other players, map data providing traversable paths that may be traversed by the player, and other data. Placement of virtual objects along a predicted path for a particular player encourages continued game play by the player by making sure the player continues to have something to interact with nearby in the parallel virtual world.

Exemplary Location-Based Parallel Reality Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other gaming systems. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices.

FIG. 1 illustrates an exemplary computer-implemented location-based gaming system 100 configured in accordance with an embodiment of the present disclosure. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
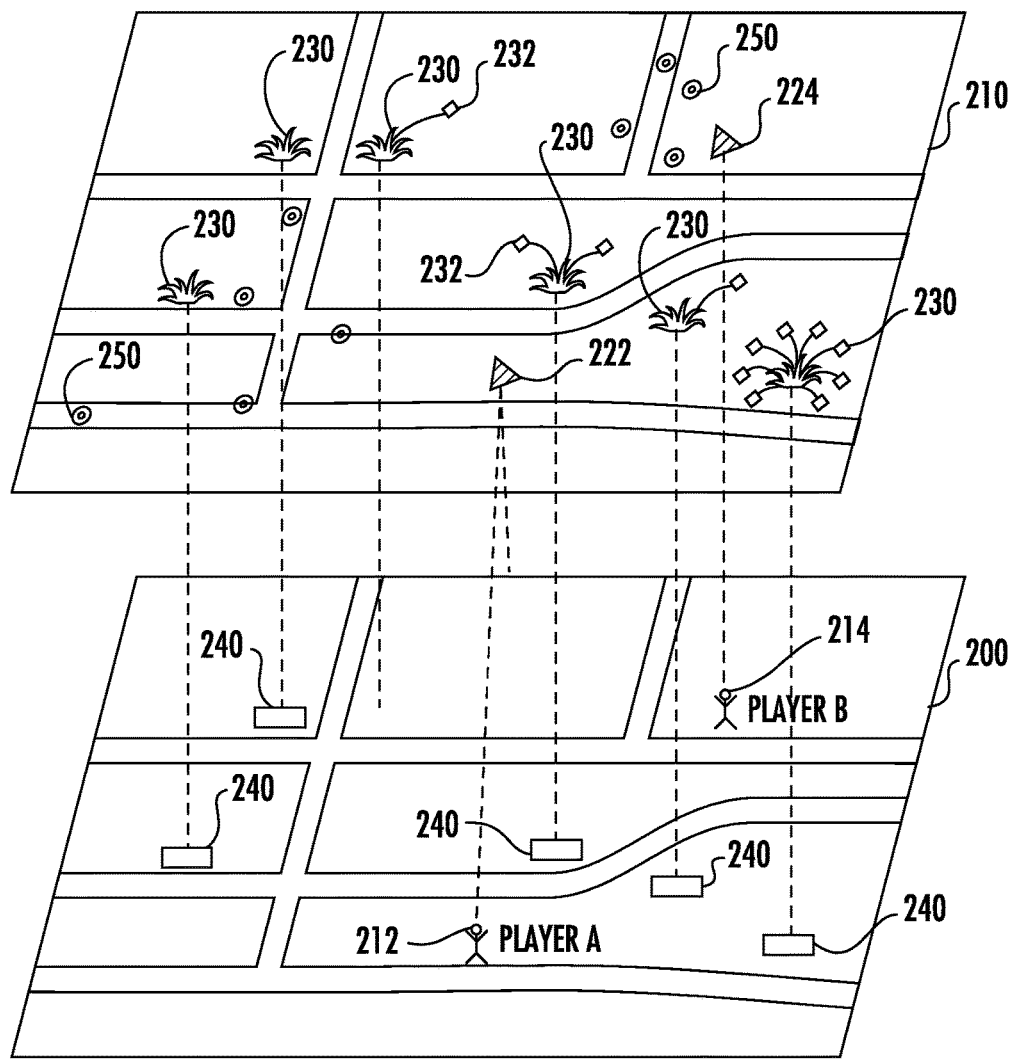
FIG. 2 depicts a representation of a virtual world having a geography that parallels the real world.

FIG. 2 depicts a conceptual diagram of a virtual world 210 that parallels the real world 200 that can act as the game board for all players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates in the real world 200 is mapped to a corresponding coordinate in a virtual space in the virtual world 210.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world 200. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, referring to FIG. 2, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 will have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives can require that players use one or more virtual items that are collected by the players in the location-based game. For instance, the players may have to travel the virtual world seeking virtual items (e.g. weapons or other items) that can be useful for completing game objectives. These virtual items can be found or collected by traveling to different locations in the real world or by completing various actions in either the virtual world or the real world. In the example shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the team and/or faction of the particular player.

In one particular implementation, a player may have to gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. In this manner, the location-based game can intrinsically be a social game that encourages cooperation among players within the game. Players from opposing teams can work against each other during the location-based game. A player can use virtual items to attack or impede progress of players on opposing teams.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although two clients 120 are illustrated in FIG. 1, any number of clients 120 can be connected to the game server 110 over the network 130. The server 110 can host a universal gaming module 112 that controls aspects of the location-based game for all players and receives and processes each player's input in the location based game. On the client-side, each client 120 can include a gaming module 125 that operates as a gaming application so as to provide a user with an interface to the system 100. The game server 110 transmits game data over the network 130 to the client 120 for use by the gaming module 125 at the client 120 to provide local versions (e.g. portions of the virtual world specific to player locations) of the game to players at locations remote from the game server 110. The server 110 can include a network interface for providing communications over the network 130. A network interface can include any suitable components for interfacing with one more networks, including for example, transmitters, receivers, ports, controllers, antennas, or other suitable components.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include one or more processors and one or more computer-readable media. The computer-readable media can store instructions which cause the processor to perform operations. The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

As will be discussed in further detail below, the game server 110 can include or can also be in communication with a real world condition database 117. The real world condition database 117 can be a part of, integral with, or separate from the game database 115. The real world condition database 117 stores data associated with real world conditions, such as such as the aggregate locations of players in the real world; local data providing locations of cultural value or commercial value; map data providing the locations of roads, highways, and waterways; current and past locations of individual players; hazard data; weather data; event calendar data; and other suitable data. The data stored in the real world condition database 117 can be collected or obtained from any suitable source. For example, in one aspect, the real world condition database 117 can be coupled to, includes, or is part of a map database storing map information, such as one or more map databases accessed by a mapping service, virtual globe, or other geographic information system. According to another exemplary aspect, the real world condition database 117 can obtain or access data associated with past and current locations of players, for instance, from the game database 115. According to yet another exemplary aspect, the real world condition database 117 can be coupled to one or more external data sources or services that periodically provide population data, hazard data, weather data, event calendar data, or other data to the real world condition database 117.

The game server 110 can be configured to receive requests for game data from one or more clients 120 (for instance, via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input, player location, and other updates to the game server 110, which the game server 110 uses to update game data in the game database 115 to reflect any and all changed conditions for the game.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, player status, landmark information, etc.) and incorporates the game data received into the overall location-based game for all players of the location-based game. The universal game module 112 can also manage the delivery of game data to the clients 120 over the network 130.

According to an exemplary embodiment of the present disclosure, the game server 110 can also include a locator module 114. The locator module 114 can be a part of or separate from the universal game module 112. The locator module 114 can be configured to access data associated with real world conditions, analyze the data, and determine locations in the virtual world to locate virtual elements in the virtual world based on the data associated with real world conditions. For instance, the locator module 114 can modify game data stored in the game database 115 to locate virtual elements in the virtual world at locations determined based on the data associated with real world conditions.

Other modules can be used with the game server 110. Any number of modules can be programmed or otherwise configured to carry out the server-side functionality described herein. In addition, the various components on the server-side can be rearranged. For instance, the game database 115 and real world condition database 117 can be integrated into the game server 110. Other configurations will be apparent in light of this disclosure and the present disclosure is not intended to be limited to any particular configuration.

A client 120 can be any portable computing device that can be used by a player to interact with the gaming system 100. For instance, a client 120 can be a wireless device, a personal digital assistant (PDA), portable gaming device, cellular phone, smart phone, tablet, navigation system, handheld GPS system, wearable computing device, display with one or more processors, or other such device. In short, a client 120 can be any computer-device or system that can execute a gaming module 125 to allow a player to interact with the game system 100.

The client 120 can include one or more processors and one or more computer-readable media. The computer-readable media can store instructions which cause the processor to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130. A network interface can include any suitable components for interfacing with one more networks, including for example, transmitters, receivers, ports, controllers, antennas, or other suitable components.

The gaming module 125 executed by the client 120 provides an interface between a player and the location-based game. The gaming module 125 can present a user interface on a display device associated with the client 120 that displays a virtual world associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130.

Because the gaming system 100 is for a location-based game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 128 tracks the position of the player and provides the player position information to the gaming module 125. The gaming module 125 updates the player position in the virtual world based on the actual position of the player in the real world. In particular, the location of the player in the virtual world can correspond to the location of the player in the real world. The gaming module 125 can provide player position information to the game server 110 over the network 130 such that the universal gaming module 112 keeps track of all player positions throughout the game. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
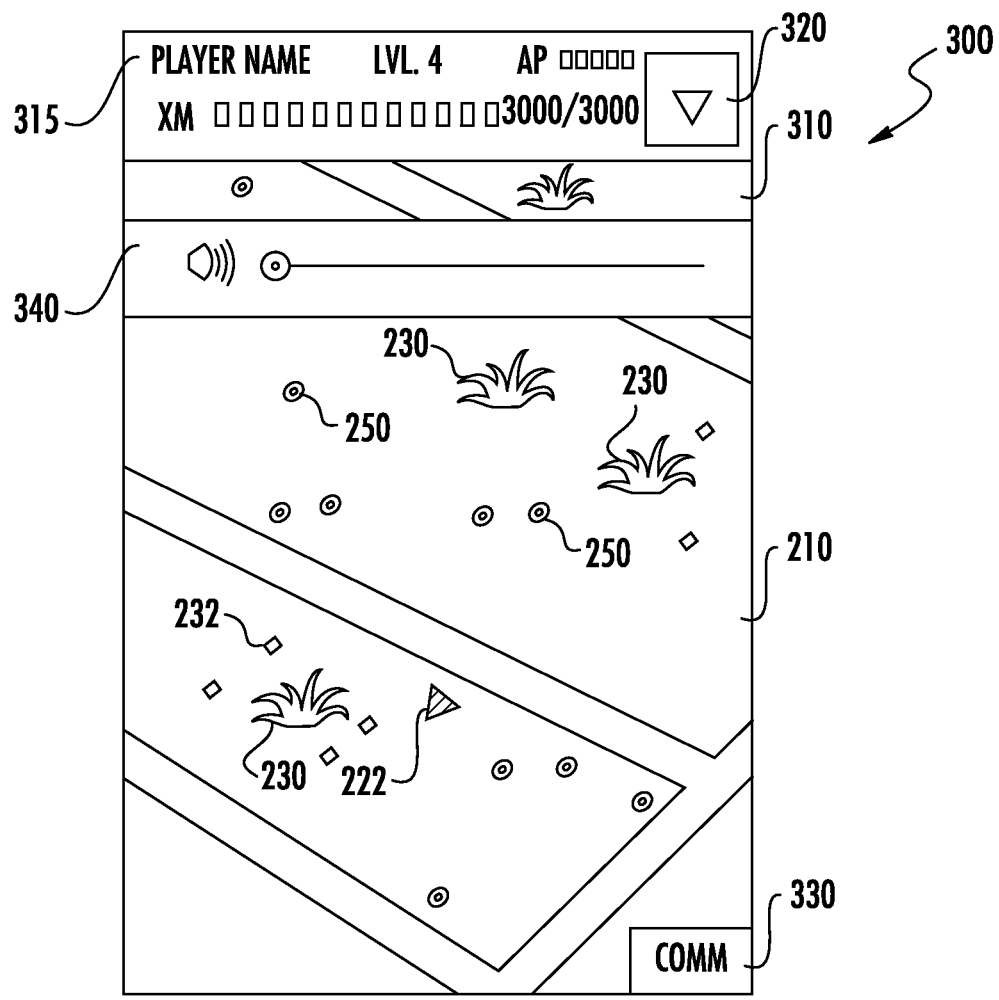
FIG. 3 depicts an exemplary game interface of a location-based game according to an exemplary embodiment of the present disclosure.

FIG. 3 depicts one particular embodiment of a game interface 300 that can be presented on a display of a client 120 as part of the interface between a player and the gaming system 100. The game interface 300 includes a display window 310 that can be used to display the virtual world 210 and various other aspects of the game, such as player position 222 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the location-based game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Figure 4:
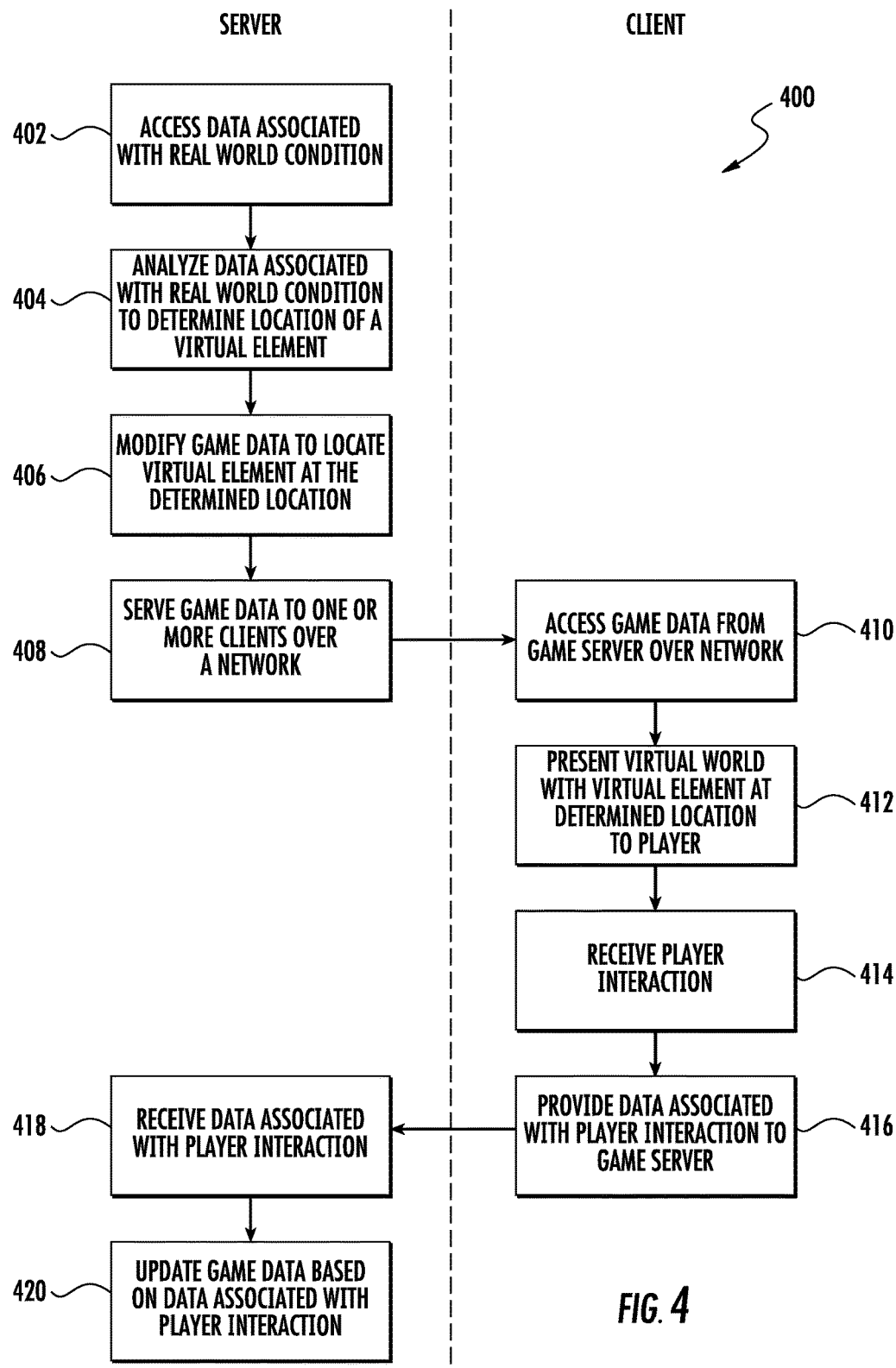
FIG. 4 depicts an exemplary client-server flow diagram of an exemplary method according to an exemplary embodiment of the present disclosure.

Exemplary Client-Server Flow Diagram for Locating Virtual Elements Based on Real World Conditions FIG. 4 depicts an exemplary client-server flow diagram of an exemplary method (400) for locating virtual elements in a virtual of a parallel reality game according to an exemplary embodiment of the present disclosure. The exemplary method (400) can be implemented using any suitable client-server architecture, such as the location-based gaming system 100 of FIG. 1. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (402), the game server 110 accesses data associated with one or more real world conditions. For instance, the locator module 114 implemented by game server 110 can access data associated with one or more real world conditions stored in the game database 115 and/or the real world condition database 117. Alternatively, the locator module 114 can access one or more different data sources providing real world condition data, such as a third party data service or other data source. Exemplary data associated with one or more real world conditions accessed by the game server 110 can include the aggregate locations of individuals (e.g. players) in the real world; local time data; local data providing locations of cultural value, recreational value, historical value, commercial value, or other value; map data providing the locations of roads, highways, and waterways, public property, private property, and other information; current and past locations of individual players; hazard data; weather data; event calendar data; and other suitable data.

At (404), the game server 110 analyzes the data associated with the one or more real world conditions to determine a location for placement of a virtual element in the virtual world based on the data associated with the one or more real world conditions. For instance, the locator module 114 can analyze the data associated with the real world condition to identify or determine locations that are suitable and/or are not suitable for placement of a virtual element in the virtual world based on the data associated with the one or more real world conditions. The locator module 114 can determine locations for placement of any type of virtual element used in the parallel reality game, such as a virtual object, virtual item, virtual energy, or other virtual element that forms a part of the parallel reality game. Exemplary analysis techniques for analyzing data associated with real world conditions to determine a location for placement of virtual elements in the virtual world will be discussed in detail below.

At (406), the game server 110 can modify game data stored in, for instance, the game database 115 and/or served to clients 120 over the network 130 to locate one or more virtual elements at locations determined based on the data associated with real world conditions. For instance, the locator module 114 can create or add one or more data objects associated with virtual elements to the game database 115 and assign virtual coordinate information with the data objects. The virtual coordinate information can specify the virtual coordinates of the determined location of the virtual elements such that virtual elements are located in the virtual world at locations determined based at least in part on data associated with real world conditions. In addition to creating or adding data objects to the game database 115, existing data objects stored in the game database 115 can be modified. For instance, virtual coordinate information for existing data objects can be adjusted to locate existing virtual elements at coordinates in the virtual world determined based on real world conditions.

At (408), the game server 110 serves game data for the parallel reality game to one or more clients 120 over the network 130. For instance, the game server 110 can send files encoded with game data to a plurality of clients 120 over the network 130. As set forth above, the game data can include data locating virtual elements in the virtual world according to any of the techniques disclosed herein.

At (410), a client 120 accesses the game data served by the game server 110. For instance, the client 120 can send a request for game data and receive game data encoded in one or more data files from the game server 110. The client 120 then presents the virtual world of the parallel reality game to the player (412). For instance, the client 120 displays a representation of the virtual world to the user on a display screen of the client 120. The virtual world can include virtual elements at locations determined based at least in part on data associated with real world conditions. Other suitable interfaces can be provided to present the virtual world to a player, such as audio, vibratory, or other interfaces so that a player can interact with the virtual world without having to look at a display screen of the client device 120.

At (414), the client 120 receives data indicative of player actions in the parallel reality game, such as data indicative of one or more player actions or player movement. Data indicative of player movement can be the location of the player in the real world determined by a positioning device 128. At (416), the client 120 provides the data indicative of the player actions to the game server 110. The game server receives the data (418) and updates the game data for the parallel reality game based on the received data (420).

Exemplary Analysis Techniques for Locating Virtual Elements Based on Real World Conditions Exemplary analysis techniques that can be performed, for instance by a locator module 114 associated with the game server 110, for locating virtual elements based on data associated with real world conditions will now be set forth. The analysis techniques set forth herein are provided for purposes of illustration and discussion. Those of ordinary skill in the art, using the disclosures provided herein, should understand that the subject matter of the present disclosure extends to any suitable process or method for determining the location of virtual elements in a virtual based on data associated with real world conditions.

Location of Virtual Elements Based on Aggregate Locations of Individuals in the Real World In one embodiment, the data associated with one or more real world conditions can include data associated with the aggregate locations of individuals in the real world. The data associated with the aggregate locations of individuals in the real world can be obtained or derived from any suitable source, such as from population charts/maps or other data sources. In one embodiment the data associated with the aggregate locations of individuals in the real world can be obtained from position information optionally provided by mobile users via mobile devices. For instance, users of mobile devices may opt in to a location tracking feature to enhance user capability of the mobile device. For instance, a user may optionally provide current position information associated with the user's mobile device, to enhance location enabled features or other features on the user's mobile device. This information can be anonymized, aggregated, and analyzed to place virtual elements in the virtual world associated with a parallel reality game. It should be understood that location information associated with a mobile device user is accessed and utilized only if permission is granted after the user has been notified that location information of the user is to be accessed and how the location information is to be used. In addition, any location information associated with users will be stored and maintained in a manner to protect privacy.

In another embodiment, the aggregate locations of individuals can be determined or based on the data associated with the position of players of the parallel reality game. For instance, data indicative of player positions in the real world can be received at the game server 110 over the network 130 from client devices 120 carried by players of the parallel reality game. This data can be aggregated and analyzed to place virtual elements in the virtual world associated with a parallel reality game.

The data associated with the aggregate locations of individuals in the real world can be analyzed, for instance by the locator module 114, to identify real world locations with high individual traffic (i.e. a relatively large number of individuals). The locator module 114 can determine to locate virtual elements at locations in the virtual world corresponding to real world locations with high individual traffic. Real world locations with high individual traffic are typically public and readily accessible. As a result, placement of virtual elements at locations corresponding to areas of higher individual traffic allows players to more easily interact with virtual elements as part of the parallel reality game.

Alternatively or in addition, the data associated with the aggregate locations of individuals can be analyzed, for instance by the locator module 114, to identify real world locations with low individual traffic (i.e. a relatively low number of individuals). Locations in the real world with low individual traffic can be private property, locations that are difficult to access in the real world, or locations otherwise not suitable for player interaction. As a result, the locator module 114 can avoid placement of virtual elements at locations in the virtual world corresponding to real world locations with low individual traffic.

In one particular implementation, the data associated with the aggregate locations of individuals, such as game players, can be analyzed in conjunction with time of day or local time data associated with a particular location in the real world. In this particular implementation, the locator module 114 can be configured to identify locations of low individual traffic at night based on the data associated with the aggregate locations of individuals and avoid placement of virtual elements in these areas at night so that players are not required to travel to potentially unsafe areas at night to play the parallel reality game.

FIG. 5 depicts a flow diagram of an exemplary method (500) for analyzing data associated with the aggregate locations of individuals in the real world to determine locations for virtual elements in the virtual world according to an exemplary aspect of the present disclosure. As shown in FIG. 5, the method includes accessing data associated with aggregated individual positions (502) and generating or accessing a heat map of individual locations based on the player position data (504). The heat map can include a plurality of cells with each cell representative of a range of coordinates defining a space in the real world and its corresponding space in the parallel virtual world. Each cell in the heat map can be associated with a value representative of the number of individuals within the cell.

FIG. 6 depicts a visual representation of an exemplary heat map 550 according to an exemplary embodiment of the present disclosure. As illustrated, the heat map includes a plurality of cells 552 with each cell 552 representative of a range of coordinates defining a space in the real world. Each of the plurality of cells can include a color or shading representative of the number of players within the cell 552. The darker colored or darker shaded cells (e.g. cell 554) can be indicative of cells 552 with a higher number of players than lighter colored or lighter shaded cells (e.g. cell 556). Other suitable representations of the number of players can be used without deviating from the scope of the present disclosure. In addition, the heat map does not have to be generated or provided in visible form. In one implementation, the heat map can simply be an array or listing of cells stored in memory with each cell associated with a numeric or other value representative of the number of individuals located in the cell.

Referring back to FIG. 5 at (506), the method can include analyzing the heat map to identify cells of the heat map associated with high individual traffic. For instance, the heat map can be analyzed to identify cells having values indicative of the number of individuals within the cell that exceed a predefined threshold. In the exemplary heat map 550 of FIG. 6, the method can include identifying the darker colored or darker shaded cells (e.g. cell 554) as cells associated with high individual traffic.

Referring to FIG. 5 at (508), the method includes making a determination to locate virtual elements at locations in the virtual world corresponding to the locations of the identified cells. For instance, the method can include locating virtual elements at locations corresponding to the darker colored or darker shaded cells (e.g. cell 554) of the heat map 550. Alternatively, or in addition, the method can include making a determination not to locate virtual elements at locations corresponding to low traffic areas, such as areas corresponding to lighter colored or lighter shaded cells (e.g. cell 556). In this manner, data associated with the aggregate locations of individuals can be used to identify areas that are suitable for placement of virtual elements that are public and easily accessible.

Location of Virtual Elements Based on Predicted Player Path

According to a particular embodiment of the present disclosure, data associated with real world conditions can be accessed and analyzed to predict a player travel path in the real world. Virtual elements can be located in the virtual world at locations corresponding to the predicted player path so that the game encourages further interaction of the player in the parallel reality game.

Figure 7:
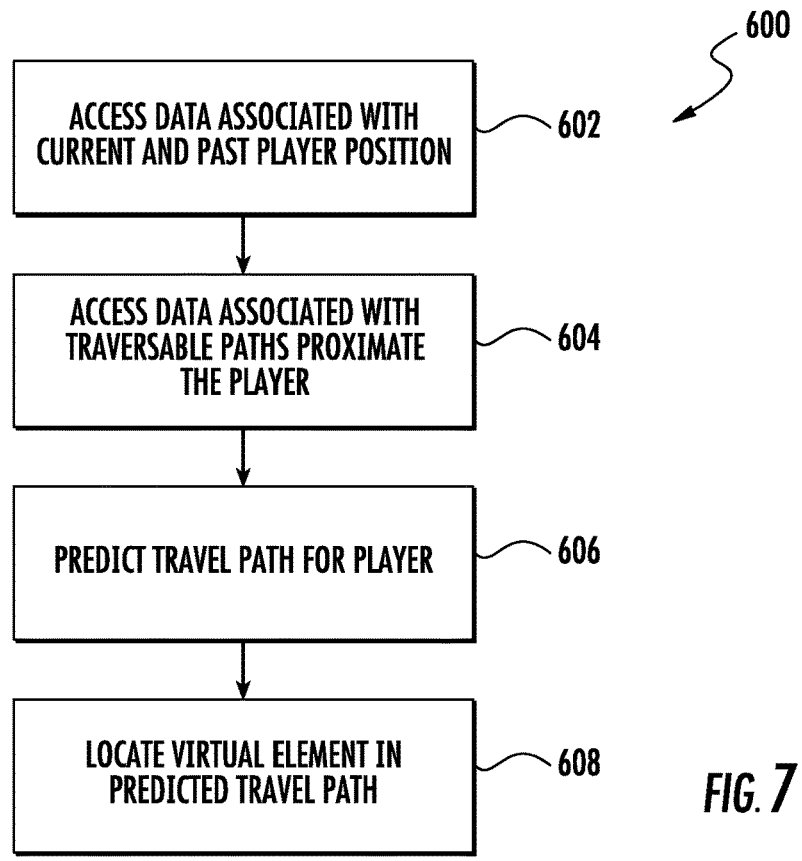
FIG. 7 depicts a flow diagram of an exemplary method of determining the location of a virtual element based on data associated with real world conditions to place the virtual element along a player's predicted travel path according to an exemplary embodiment of the present disclosure.

FIG. 7 depicts one exemplary method (600) for locating virtual elements in a predicted travel path. At (602), data associated with current and past player position for a particular player of the parallel reality game is accessed. For instance, the locator module 114 can access data associated with current and past player position for a particular player of the parallel reality game. Such data can be accessed, for instance, from the game database 115 which stores position information associated with players of the parallel reality game.

At (604), data associated with traversable paths proximate the player can be accessed. For instance, the locator module 114 can access map data providing the locations of traversable paths proximate the player. Other data associated with real world conditions can also be accessed, such as aggregate movement of other players in the area, paths taken previously by the player, or other suitable data.

At (606), the method includes predicting player path based on the accessed data. For instance, the locator module 114 can analyze current player position and direction, past player position and direction, the locations of traversable paths proximate the players and predict a future path for the player. At (608), the method can include locating a virtual element along the predicted player path.

Figure 8:
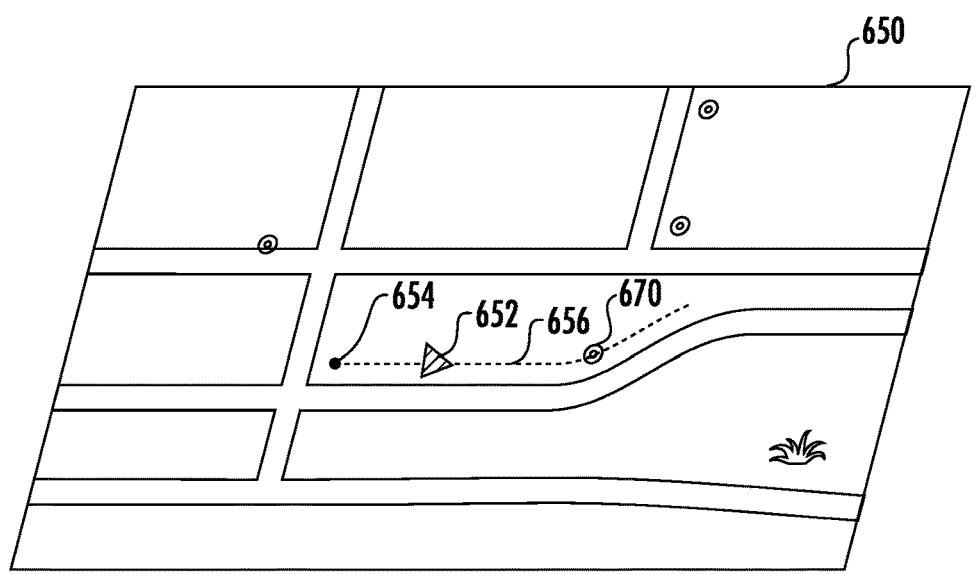
FIG. 8 depicts an exemplary representation of placing a virtual element along a player's predicted travel path according to an exemplary embodiment of the present disclosure.

FIG. 8 depicts a graphical representation of locating a virtual element along a predicted player path according to an exemplary embodiment of the present disclosure. As shown, player 652 has traveled along path 654 in virtual world 650. The locator module 114 can analyze the data associated with real world conditions, such as past and current player position and data associated with traversable paths proximate the player to predict travel path 656 for the player. The locator module 114 can then locate a virtual element, such as virtual energy 670, along the predicted player path 656.

Location of Virtual Elements Based on Other Data Associated with Real World Conditions In another embodiment, the data associated with real world conditions can include local data providing locations of cultural, recreational, or commercial value in the real world. For instance, the data associated with real world conditions can include locations, in the real world, of public artwork, historical markers, tourist attractions, scenic vistas, libraries, hiking trails, museums, universities, arenas, parks, and/or other locations. The locator module 114 can analyze the data and determine a location for placement of a virtual element at a location in the virtual world corresponding to the locations of cultural, recreation, or commercial value in the real world. In this way, virtual elements can be determined to be located in the virtual world in a manner to encourage players to travel to the locations of cultural, recreational, or commercial value in the real world in order to interact with the virtual element.

In another embodiment, the data associated with real world conditions can include map data providing the locations of roads, highways, waterways, private property, and/or other unsafe locations. The locator module 114 can analyze the data and determine a location for placement of a virtual element at a location in the virtual world based on the map data. For instance, the locator module 114 can determine a location that avoids placement of virtual object at locations corresponding to locations on or very close to roadways, highways, or waterways, on private property, or in other unsafe locations in the real world.

In yet another embodiment of the present disclosure, the data associated with the real world conditions can include hazard data. The locator module 114 can analyze the data and determine a location for placement of a virtual element at a location in the virtual world based on the hazard data. For instance, the locator module 114 can determine a location that avoids placement of a virtual element in hazardous areas.

In still another embodiment of the present disclosure, the data associated with real world condition can include weather data. The locator module 114 can analyze the data and determine a location for placement of a virtual element at a location in the virtual world based on the weather data. For instance, the locator module 114 can determine to provide more placements of virtual objects in sheltered locations during bad weather and to provide more placements of virtual objects outdoors during good weather.

In still another embodiment of the present disclosure, the data associated with real world conditions can include event calendar data that provides the locations of, for instance, sporting events, conferences, and/or other events that will draw large crowds. The locator module 114 can analyze the data and determine a location for placement of a virtual element at locations corresponding to the locations of the sporting events, conferences, and/or other events that will draw large crowds.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of locating virtual elements in a virtual world associated with a parallel reality game, the method comprising:

hosting, at a server, the parallel reality game, the parallel reality game including interactions with virtual elements in the virtual world stored in a game database, the virtual world having a geography that parallels at least a portion of the geography of the real world such that a player can navigate the virtual world by moving to different geographic locations in the real world;

receiving, at the server, location data indicating a geographic location of a mobile device associated with a player;

retrieving, by the server, real world condition data associated with one or more real world conditions;

determining, based on the location data and the real world condition data, a location for a virtual element in the virtual world;

updating the game database to include the virtual element at the determined location; and transmitting, by the server to other mobile devices associated with other players, information for displaying the virtual element at the determined location in the virtual world.

2. The computer-implemented method of claim 1, wherein the real world condition data comprises data associated with aggregate locations of a plurality of individuals in the real world, and the location of the virtual element is one with high individual traffic.

3. The computer-implemented method of claim 2, wherein the data associated with the aggregate locations of the plurality of individuals comprises a heat map generated based on the locations of the plurality of individuals in the real world.

4. The computer-implemented method of claim 2, wherein determining the location for the virtual element comprises:

determining a number of individuals in an area that includes the location based on the real world condition data; and determining the location is one with high individual traffic if the number of individuals in the area exceeds a threshold.

5. The computer-implemented method of claim 1, wherein the real world condition data comprises data associated with one or more of locations of cultural, recreational, or commercial value.

6. The computer-implemented method of claim 1, wherein the real world condition data comprises road map data.

7. The computer-implemented method of claim 1, wherein the real world condition data comprises hazard data.

8. The computer-implemented method of claim 1, wherein the real world condition data comprises weather data.

9. The computer-implemented method of claim 1, wherein the real world condition data comprises event calendar data.

10. The computer-implemented method of claim 1, wherein determining the location for the virtual element comprises:

predicting a player's travel path in the virtual world based on the geographic location of the mobile device associated with the player; and selecting a location in the virtual world in the player's travel path as the location.

11. A computer-based system for implementing a parallel reality game, the computer-based system comprising:

a game server operable to host a parallel reality game, the game server having one or more computer-readable media, one or more processors, and a network interface, the parallel reality game including interactions with virtual elements in a virtual world stored in a game database, the virtual world having a geography that parallels at least a portion of the geography of the real world such that a player can navigate the virtual world by moving to different geographic locations in the real world;

the game server configured to:

receive, via a network interface, location data indicating a geographic location of a mobile device associated with a player;

access a data source storing real world condition data associated with one or more real world conditions;

determine, based on the location data and the real world condition data, a location for a virtual element in the virtual world;

update the game database to include the virtual element at the determined location; and transmit, to other mobile devices associated with other players via the network interface, information for displaying the virtual element at the determined location in the virtual world.

12. The computer-based system of claim 11, wherein the real world condition data comprises data associated with aggregate locations of a plurality of individuals in the real world, and the location of the virtual element is one with high individual traffic.

13. The computer-based system of claim 12, wherein the data associated with the aggregate locations of the plurality of individuals comprises a heat map generated based on the locations of the plurality of individuals in the real world.

14. The computer-based system of claim 12, wherein the game server determines the location for the virtual element by performing operations including:

determining a number of individuals in an area that includes the location based on the real world condition data; and determining the location is one with high individual traffic if the number of individuals in the area exceeds a threshold.

15. The computer-based system of claim 11, wherein the game server determines the location for the virtual element by performing operations including:

predicting a player's travel path in the virtual world based on the geographic location of the mobile device associated with the player; and selecting a location in the virtual world in the player's travel path as the location.

16. A tangible, non-transitory computer-readable medium storing computer-readable instructions for execution by one or more processors, causing the one or more processors to perform operations for locating virtual elements in a virtual world associated with a parallel reality game, the parallel reality game including interactions with virtual elements in the virtual world stored in a game database, the virtual world having a geography that parallels at least a portion of the geography of the real world such that a player can navigate the virtual world by moving to different geographic locations in the real world, the operations comprising:

receiving location data indicating a geographic location of a mobile device associated with a player;

retrieving real world condition data associated with one or more real world conditions;

determining, based on the location data and the real world condition data, a location for a virtual element in the virtual world;

updating the game database to include the virtual element at the determined location; and transmitting, to other mobile devices associated with other players, information to display the virtual element at the determined location in the virtual world.

17. The tangible, non-transitory computer-readable medium of claim 16, wherein the real world condition data comprises data associated with aggregate locations of a plurality of individuals in the real world, and the location of the virtual element is one with high individual traffic.

18. The tangible, non-transitory computer-readable medium of claim 17, wherein the data associated with the aggregate locations of the plurality of individuals comprises a heat map generated based on the locations of the plurality of individuals in the real world.

19. The tangible, non-transitory computer-readable medium of claim 17, wherein determining the location for the virtual element comprises:
   determining a number of individuals in an area that includes the location based on the real world condition data; and
   determining the location is one with high individual traffic if the number of individuals in the area exceeds a threshold.

20. The tangible, non-transitory computer-readable medium of claim 16, wherein determining the location for the virtual element comprises:
   predicting a player's travel path in the virtual world based on the geographic location of the mobile device associated with the player; and
   selecting a location in the virtual world in the player's travel path as the location.

* * * * *